United States Patent [19]

Raghupathi et al.

[11] 4,300,410
[45] Nov. 17, 1981

[54] TENSION-COMPRESSION MEMBER

[75] Inventors: Narasimhan Raghupathi, Westland; Edward A. Kure, Lathrup Village, both of Mich.

[73] Assignee: Ford Motor Company, Dearborn, Mich.

[21] Appl. No.: 109,447

[22] Filed: Jan. 4, 1980

[51] Int. Cl.³ .............................................. G05G 1/00
[52] U.S. Cl. .................................. 74/579 R; 156/172; 403/210; 403/291; 428/35; 428/377; 428/398
[58] Field of Search ............... 156/172, 169, 425, 245; 428/375, 377, 35, 36, 398; 74/579 R, 581; 403/270, 210, 291; 64/11 R; 24/265 EF

[56] References Cited

U.S. PATENT DOCUMENTS

| | | | |
|---|---|---|---|
| 3,185,603 | 5/1965 | Boggs | 156/200 |
| 3,260,796 | 7/1966 | Hirtzer | 156/172 |
| 3,362,252 | 1/1968 | Ditlinger | 74/579 |
| 3,850,722 | 11/1974 | Kreft | 156/172 |
| 3,851,786 | 12/1974 | Kaempen | 156/169 |
| 4,097,322 | 1/1978 | Green et al. | 156/172 |
| 4,120,998 | 10/1978 | Olez | 428/35 |
| 4,183,261 | 1/1980 | Eiselbrecher et al. | 74/579 R |

OTHER PUBLICATIONS 416 134 A;134 R;230

Primary Examiner—Michael W. Ball
Attorney, Agent, or Firm—Peter D. McDermott; Olin B. Johnson

[57] ABSTRACT

Light weight component (FIG. 1) comprising hollow, tubular member (A) with load transmission means (B) at its ends and filaments (E) in a plastic matrix C encircling the member and transmission means may be used as tension compression member. The tubular member preferably is a pultrusion adapted to contain sufficient filaments to tensilely strengthen the component. The component may be made, for example, by winding or wrapping filaments about the member while load transmission means are at its ends.

8 Claims, 4 Drawing Figures

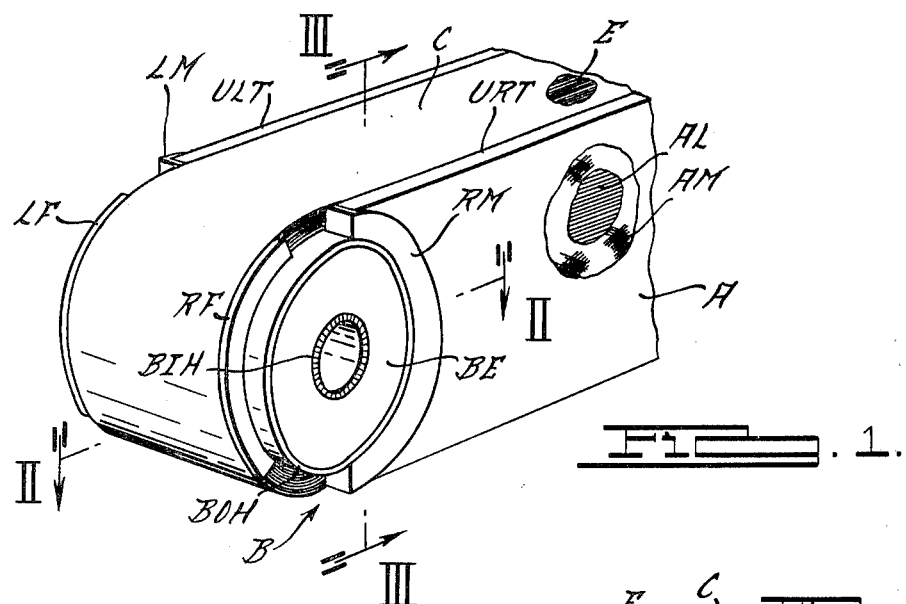
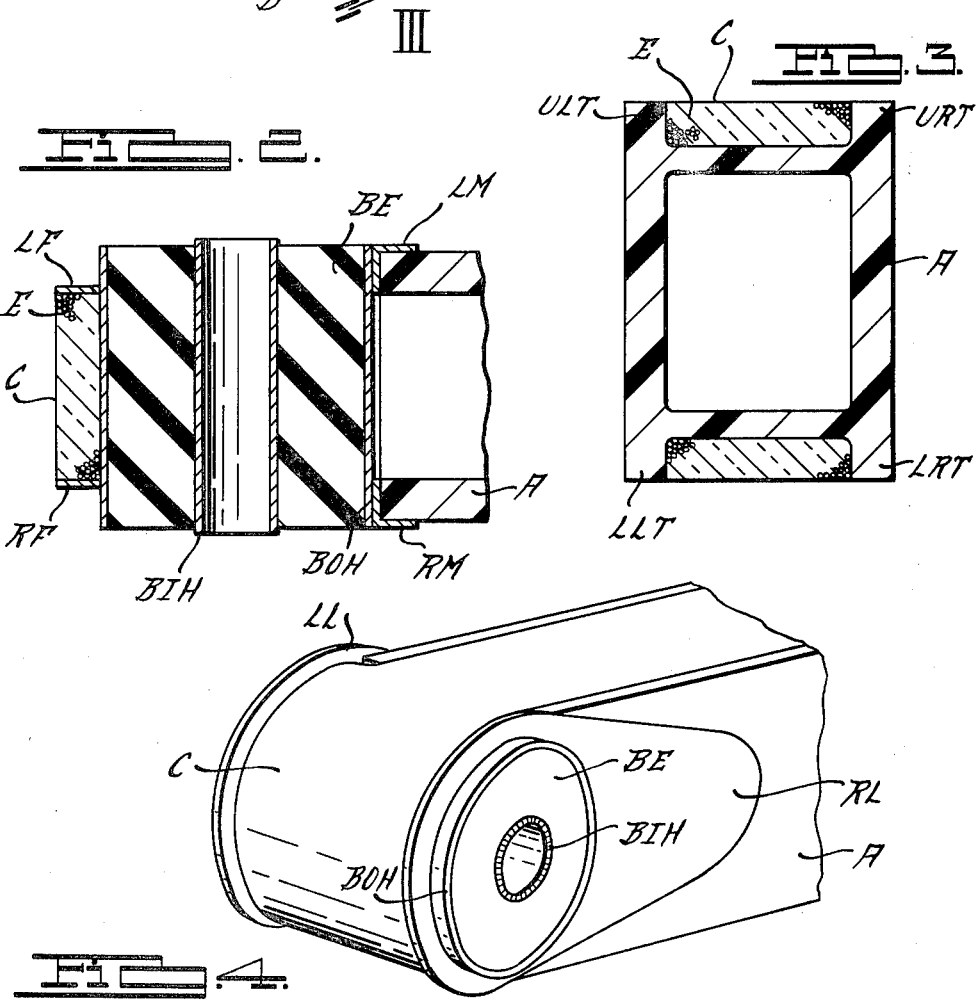

TENSION-COMPRESSION MEMBER

BACKGROUND OF THE INVENTION

This invention relates to a lightweight structural component. More particularly, this invention relates to plastic composites suitable for such applications as vehicular lower control arms.

The need for lighter weight vehicular components is widely known, particularly with respect to automotive applications. Moreover, the potential of plastic or other lightweight materials to satisfy such need as to structural components is established. Anisotropic behavior of many reinforced plastics, however, complicates effective substitution of such plastics for metal. Moreover, even when a design utilizes anisotropic materials effectively, manufacturing considerations may limit its implementation.

Design and manufacture of components that are to withstand tensile and/or compressive loads are known (e.g., see U.S. Pat. Nos. 3,228,481; 3,286,547; 3,362,252; 3,434,899; 3,460,628; 3,470,051; 3,542,079; 3,607,510; 3,673,028; 3,691,000; 3,769,127; 3,850,722. Included among these patents are disclosures of lightweight structural components. None of these patents, however, show manufacture or design components that withstand repetitive tensile and compressive loads and which comprise load transmission means at the ends of a hollow tubular member longitudinally encircled by filaments in a plastic matrix as in this invention.

It is an object of this invention to provide lightweight structural components which withstand repetitive tensile and compressive loads in use.

It is an object of this invention to provide such lightweight components which are conveniently manufactured.

It is an object of this invention to provide manufacturing techniques for such lightweight components.

These objects and others have been accomplished by this invention as may be seen from the hereinafter disclosure.

BRIEF DESCRIPTION OF THE DRAWINGS

FIG. 1 illustrates an end portion of an embodiment of this invention. Shown by this figure are a beam section A having metal wraps RM and LM encapsulating a portion of its end, bushing B and filaments E in plastic matrix C encircling lengthwise the beam so as to contain bushing B. Also, FIG. 1 shows schematically in cut aways (A) fibrous reinforcement of beam section A in absence of its plastic matrix and (B) filaments E in absence of plastic matrix C.

FIG. 2 is a section taken around II—II of FIG. 1.

FIG. 3 is a section taken around III—III of FIG. 1.

FIG. 4 illustrates an end portion of another component embodying a bushing B which has rigidly mounted integral lugs RL and LL. Lugs RL and LL are bonded to beam A. Filaments E in plastic matrix C, as in FIG. 1, encircle the component.

BRIEF DESCRIPTION OF THE INVENTION

This invention relates to a lightweight structural component that has a hollow tubular member with load transmission means at its ends and in which there is a band comprising filaments in a plastic matrix that longitudinally encircle said component and said load transmission means. More particularly and preferably, the lightweight component in accordance with this invention comprises (A) a first tubular member, (B) a second tubular member located near one end of said first tubular member such that its center longitudinal axis is at least substantially perpendicular to the center longitudinal axis of said first member, (C) a third tubular member located near the other end of said first tubular member such that its center longitudinal axis lies in substantially the same plane as said center longitudinal axis of said second tubular member and (D) filaments in a plastic matrix that encircle said first tubular member so as to restrain said second and third tubular members.

In preferred embodiment, the first tubular member comprises a hollow, pultruded, reinforced plastic beam, preferably comprising continuous and matted fibers. The beam comprises two opposite longitudinal faces having tabs that project perpendicularly along each face. The tabs form a trough shaped cavity of sufficient depth to contain a tensely strengthening amount of filaments for the component. The filaments are wound or wrapped along such faces during manufacture of the component. The second and third tubular members each comprise a rigid hub that contains elastomeric material. In the elastomeric material a second hub or other means for attaching the component lies along the center longitudinal axis of the rigid hub. The filaments in plastic matrix comprise one or more strands of glass or other reinforcing fiber.

In making the preferred component, the pultruded beam is adapted to receive the rigid hubs at its ends, the hubs are positioned at the ends, and filaments are wound or wrapped about the beam and so as to contain the hubs at the ends of the beam. The filaments may be dipped in resin and wound lengthwise about the component or alternatively, or in addition, be in a resin tape that also is wound or layed lengthwise about the component.

DETAILED DESCRIPTION OF THE INVENTION

This invention has particular application to components that are exposed to repeated tensile and compressive loads. For example, lower control arms in automobiles act to maintain alignment of the rear axle and frame. These lower control arms extend between the axle and frame or lower body structures and maintain a fixed relationship therebetween.

FIGS. 1, 2 and 3 show, respectively, an end of a component of this invention, a section taken around II—II of FIG. 1 and a section taken around III—III of FIG. 1. Since the component is symetrical, only one end need be illustrated.

In these figures, it can be seen that filaments E in plastic matrix C encircle hollow tubular member A and bushing B. The filaments E in plastic matrix C encircle lengthwise tubular member A so as to similarly contain a bushing at the other end (not shown).

The end of tubular A is adapted to receive bushing B and particularly bushing outer hub BOH. Interposed between tubular member A and bushing B are end caps RM and LM that protect the end of tubular member A. End caps RM and LM fit on either side of end of member A and are bonded thereto by suitable adhesive.

Hub member BOH has welded flanges LF and RF that partially encircle BOH. Flanges LF and RF serve to help contain filaments as they are wrapped or wound about BOH during manufacture of the component.

Within hub member BOH is elastomeric material BE that acts to cushion loads applied to the component. Within elastomeric material BE is attachment means for the component which in the case of this embodiment is inner hub BIH. In use, a pin (not shown) or other load attachment means is mounted to hub BIH.

As shown more particularly in FIGS. 2 and 3, tubular member A is hollow and of rectilinear cross section. As seen particularly from FIG. 1, tubular member A comprises longitudinal fibers AL interspersed in fiber matt AM. Although member A may be of any configuration, the rectilinear configuration shown has advantage with respect to its manufacture (e.g., pultrusion using reinforcing fiber) as well as in manufacture of the component.

Tabs or flanges LLT, LRT, ULT and URT respectively project from the surface of tubular member A and serve as guides and form channels for filaments E in plastic matrix C during manufacture. The inner well between each set of tabs, ULT and URT and LRT and LLT, respectively preferably have adhesive so as to bond filaments E in plastic matrix C to tubular member A. Filaments E in plastic matrix C comprise one or more strands of reinforcing filaments. They may be applied to the component by a filament winding or tape winding process.

The embodiment of FIG. 4 differs from that of FIG. 1 in that end caps RM and LM are omitted. Additionally, the component of FIG. 4 has lugs RL and LL which are integral with bushing B. Lugs RL and LL are affixed (e.g. press fit or welded) around the circumference of bushing outer hub BOH. Also, they are bonded to tubular member A by suitable adhesive (e.g., epoxy film type). Lugs RL and LL also serve to transmit loads to the sides of hollow tubular member A.

The hollow tubular member such as A of FIGS. 1, 2 and 3 (or A of FIG. 4 which is the same as A of FIGS. 1, 2 and 3) is preferably made by a pultrusion process. For example, continuous filaments may be drawn through a resin and pulled through a die along with a chopped fiber matt to provide a continuous pultrusion section. The pultrusion thus has longitudinal continuous fibers interspersed in a plastic matrix that additionally has embedded fibrous matt of longitudinal and transverse fibers. Preferably, the fiber reinforcement comprises at least about 50% by weight of the combined weight of fiber and resin and is glass or carbon fiber or both.

The resin is preferably thermosetting and may be epoxy, vinyl ester, polyester and the like and in which case it may be cured (e.g., by heating) as the section during its passage through the pultrusion die.

After cure, the section is cut to length and preferably adapted to receive load transmission means at either end. This may be done by simply shaping (e.g., cutting) the ends of the pultruded section so as to receive a bushing or other load transmission means.

With the bushings fitted to the ends of the hollow, pultruded member, a winding or wrapping operation provides a band that lengthwise encircles the tubular member so as to lock the bushings firmly in place. Lugs such as L and RL of FIG. 4 may be used to adhere the bushing to the side of the hollow pultruded beam, if desired. Thus, for example, one lug may be welded or otherwise fixed (e.g. press fitted) to each bushing and thereafter, the assembly mounted on the ends of the pultrusion. The other lug may be then similarly fitted and the band comprising filaments wound or wrapped about the assembly.

The filaments in the plastic matrix preferably comprise several strands of fiber. Preferably, the fiber weight of these filaments wound or wrapped lengthwise about the component comprise glass or graphite or both at least about 60% by weight of the total weight of resin and fibers. In winding or wrapping operations, the assembly of bushings at the end of the adapted pultruded beam may be placed under compressive load, for example, 1500–2500 lbs. Release of the load upon completion of winding or wrapping operations then provides a predetermined tension to the filaments E surrounding the component. Alternatively or, in addition, the filaments (e.g, 100–300) may be wound or wrapped under a desired tension of, for example, 1–15, preferably 5–10 lbs. each.

The components of this invention withstand repeated tensile and compressive loads. Filaments E carry a tensile load applied to bushing B in the embodiment of FIGS. 1, 2 and 3. Beam A carries compressive load in this embodiment. In the embodiment of FIG. 4, lugs RL and LL and the lugs at the other end share compressive and tensile loads and transmit such loads to tubular member A.

Component of this invention withstand repeated loads of about =6300 lbs. Minimum load is about 11,000 lbs. The component functions at temperatures varying between −40° F. to 200° F.

What is claimed is:

1. A lightweight structural component which comprises:
   (a) a first tubular member having a first end and a second end and two pairs of integrally formed extending longitudinally from two opposing sides thereof and forming oppositely positioned channels along the exterior of said first tubular member,
   (b) a second tubular member juxtapositioned with respect to said first end of said first tubular member such that its longitudinal axis is substantially perpendicular to the longitudinal axis of said first tubular member, and
   (c) a third tubular member juxtapositioned with respect to said second end of said first tubular member such that its longitudinal axis is substantially perpendicular to the longitudinal axis of said first tubular member and in substantially the same plane as said longitudinal axis of said second tubular member,
   (d) filaments in a plastic matrix that encircle lengthwise said first tubular member, lay within said oppositely positioned channels, and bind said second tubular member and said third tubular member to said first end and said second end respectively, said first tubular member having a cavity extending along its longitudinal axis, said second tubular member and said third tubular member each having a cavity extending along its longitudinal axis and substantially filled with elastomeric materials, said elastomeric materials having load attachments means positioned therein.

2. A lightweight structural component in accordance with claim 1 wherein said plastic matrix is secured to said first tubular member by adhesive means.

3. A lightweight structural component in accordance with claim 1 wherein said second tubular member and said third tubular member are secured to said first tubular member by adhesive means.

4. A lightweight structural component in accordance with claim 1 wherein said cavity of said first tubular member is formed by interior surfaces of said first tubular member which in cross section surround a substantially rectangular area.

5. A lightweight structural component in accordance with claim 1 wherein said substantially rectangular area comprises a major proportion of the cross sectional area of said first tubular member.

6. A lightweight structural component in accordance with claim 1 wherein said first tubular member comprises reinforced plastic.

7. A lightweight structural component in accordance with claim 1 wherein said second tubular member and said third tubular member comprise rigid material.

8. A lightweight structural component which comprises:
(a) an elongated first tubular member having a first end and a second end, and two pairs of integrally formed flanges extending longitudinally from two opposing sides thereof and forming oppositely positioned channels along the exterior of said first tubular member,
(b) a second tubular member juxtapositioned with respect to said first tubular member such that its longitudinal axis is esentially perpendicular to the longitudinal axis of said first tubular member, and
(c) a third tubular member juxtapositioned with respect to said second end of said first tubular member such that its longitudinal axis is essentially perpendicular to the longitudinal axis of said first tubular member and in essentially the same plane as said longitudinal axis of said second tubular member,
(d) filaments in a plastic matrix that encircle lengthwise said first tubular member, lay within said oppositely positioned channels, and bind said second tubular member and said third tubular member to said first end and said second end respectively, said first tubular member having a substantially rectangular cavity extending the full length of its longitudinal axis, said second tubular member and said third tubular member each having a cavity extending along essentially the full length of its longitudinal axis and substantially filled with elastomeric materials, said elastomeric materials having load attachment means positioned therein.

* * * * *